US012585662B1

(12) United States Patent
Mohammed et al.

(10) Patent No.: US 12,585,662 B1
(45) Date of Patent: Mar. 24, 2026

(54) CONCURRENT COMMUNICATION IN DISTRIBUTED SERVER SYSTEM FOR NETWORKED CONTENT RETRIEVAL AND GRAPH NETWORK DATA TRANSMISSION

(71) Applicant: U.S. Bancorp, National Association, Minneapolis, MN (US)

(72) Inventors: Ahmed Mohammed Abdelrahman Mohammed, Dallas, TX (US); Samuel Assefa, Watertown, MA (US)

(73) Assignee: U.S. Bancorp, National Association, Minneapolis, MN (US)

( * ) Notice: Subject to any disclaimer, the term of this patent is extended or adjusted under 35 U.S.C. 154(b) by 0 days.

(21) Appl. No.: 19/017,302

(22) Filed: Jan. 10, 2025

Related U.S. Application Data

(60) Provisional application No. 63/727,447, filed on Dec. 3, 2024.

(51) Int. Cl.
*G06F 16/2457* (2019.01)
*G06F 16/242* (2019.01)
*G06F 16/901* (2019.01)

(52) U.S. Cl.
CPC ...... *G06F 16/24578* (2019.01); *G06F 16/243* (2019.01); *G06F 16/9024* (2019.01)

(58) Field of Classification Search
CPC ............. G06F 16/24578; G06F 16/243; G06F 16/9024
See application file for complete search history.

(56) References Cited

U.S. PATENT DOCUMENTS

| | | | | |
|---|---|---|---|---|
| 9,646,206 | B2 * | 5/2017 | Ross | ...................... G06T 7/0008 |
| 12,332,896 | B1 * | 6/2025 | Xu | ..................... G06F 16/24549 |
| 12,373,475 | B1 * | 7/2025 | Cappetta | ............. G06F 16/3347 |
| 2017/0039245 | A1 * | 2/2017 | Wholey, III | ........ G06F 16/2428 |

(Continued)

OTHER PUBLICATIONS

Peng et al., "Graph Retrieval-Augmented Generation: A Survey" (2024), J. ACM vol. 37, No. 4, Article 111 (Sep. 2024), 41 pages.

(Continued)

*Primary Examiner* — Charles Rones
*Assistant Examiner* — Ken Hoang
(74) *Attorney, Agent, or Firm* — FOLEY & LARDNER LLP

(57) ABSTRACT

A method and related systems for increasing relevant content transmission may include storing first content representation in a first server and second content representations in a second server, generate a query representation based on a query, retrieving an intermediate representations by concurrently using the first server to retrieve a first representation subset based on the first content representations and using the second server to retrieve a second representation subset based on the second content representations. The method also includes using a graph neural network to re-rank similarities to select a ranked graph subset, determining an input context that includes selected content including data from the first server and the second server based on an association between the selected content and the ranked graph subset, and generating a language model response by transmitting, to an API of a language model, an input comprising the query and the input context.

20 Claims, 6 Drawing Sheets

(56)  References Cited

U.S. PATENT DOCUMENTS

| | | | | |
|---|---|---|---|---|
| 2021/0334606 A1* | 10/2021 | Du | .......................... | G06F 18/29 |
| 2022/0138432 A1* | 5/2022 | Galitsky | ............... | G06F 40/284 |
| | | | | 704/9 |
| 2023/0267025 A1* | 8/2023 | Karlberg | ............ | G06F 16/2358 |
| | | | | 714/25 |
| 2024/0202193 A1* | 6/2024 | Kumar | ................ | G06F 16/2455 |
| 2025/0173328 A1* | 5/2025 | Sivulka | ................. | G06F 16/248 |

OTHER PUBLICATIONS

Shang et al., "A Survey of Large Language Models on Generative Graph Analytics: Query, Learning, and Applications" (2024), arXiv:2404.14809v1 [cs.CL], 31 pages.
Yu et al., "KG-FiD: Infusing Knowledge Graph in Fusion-in-Decoder for Open-Domain Question Answering" (2022), arXiv:2110.04330v2 [cs.CL], 14 pages.

* cited by examiner

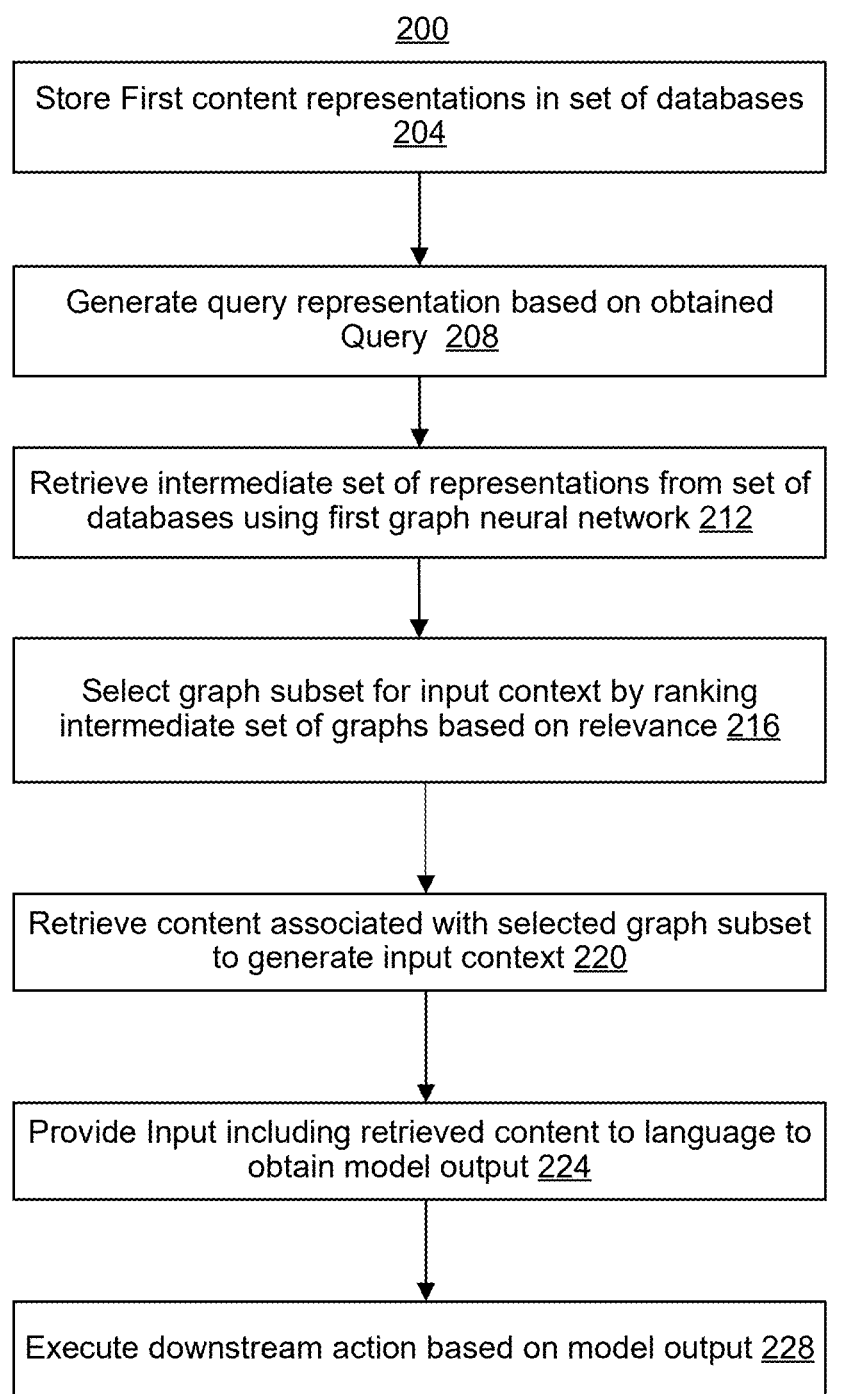

200

Store First content representations in set of databases 204

Generate query representation based on obtained Query 208

Retrieve intermediate set of representations from set of databases using first graph neural network 212

Select graph subset for input context by ranking intermediate set of graphs based on relevance 216

Retrieve content associated with selected graph subset to generate input context 220

Provide Input including retrieved content to language to obtain model output 224

Execute downstream action based on model output 228

FIG. 2

CONCURRENT COMMUNICATION IN DISTRIBUTED SERVER SYSTEM FOR NETWORKED CONTENT RETRIEVAL AND GRAPH NETWORK DATA TRANSMISSION

CROSS-REFERENCE TO RELATED APPLICATIONS

This application claims the benefit of priority to U.S. Provisional Application No. 63/727,447, filed Dec. 3, 2024, the entirety of which is incorporated by reference herein.

BACKGROUND

Generative artificial intelligence (AI) systems can function by predicting sequential tokens based on extensive training data, using neural networks to understand and generate various types of important content. Generative AI systems can be used to drastically enhance the speed and accuracy of solutions. For example, generative AI systems can analyze network traffic patterns and automatically adjust routing configurations in real-time. These systems can rely on prompts to guide the output. Retrieval-augmented generation (RAG) can augment an input prompt by providing additional context to a user-provided prompt, where such operations can increase the efficiency and accuracy of instruction generation.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 2 illustrates an example process for increasing relevant content transmission when using a language model, in accordance with an implementation.

FIG. 6 illustrates an example machine learning framework that techniques described herein may benefit from.

DETAILED DESCRIPTION

Figure 1:
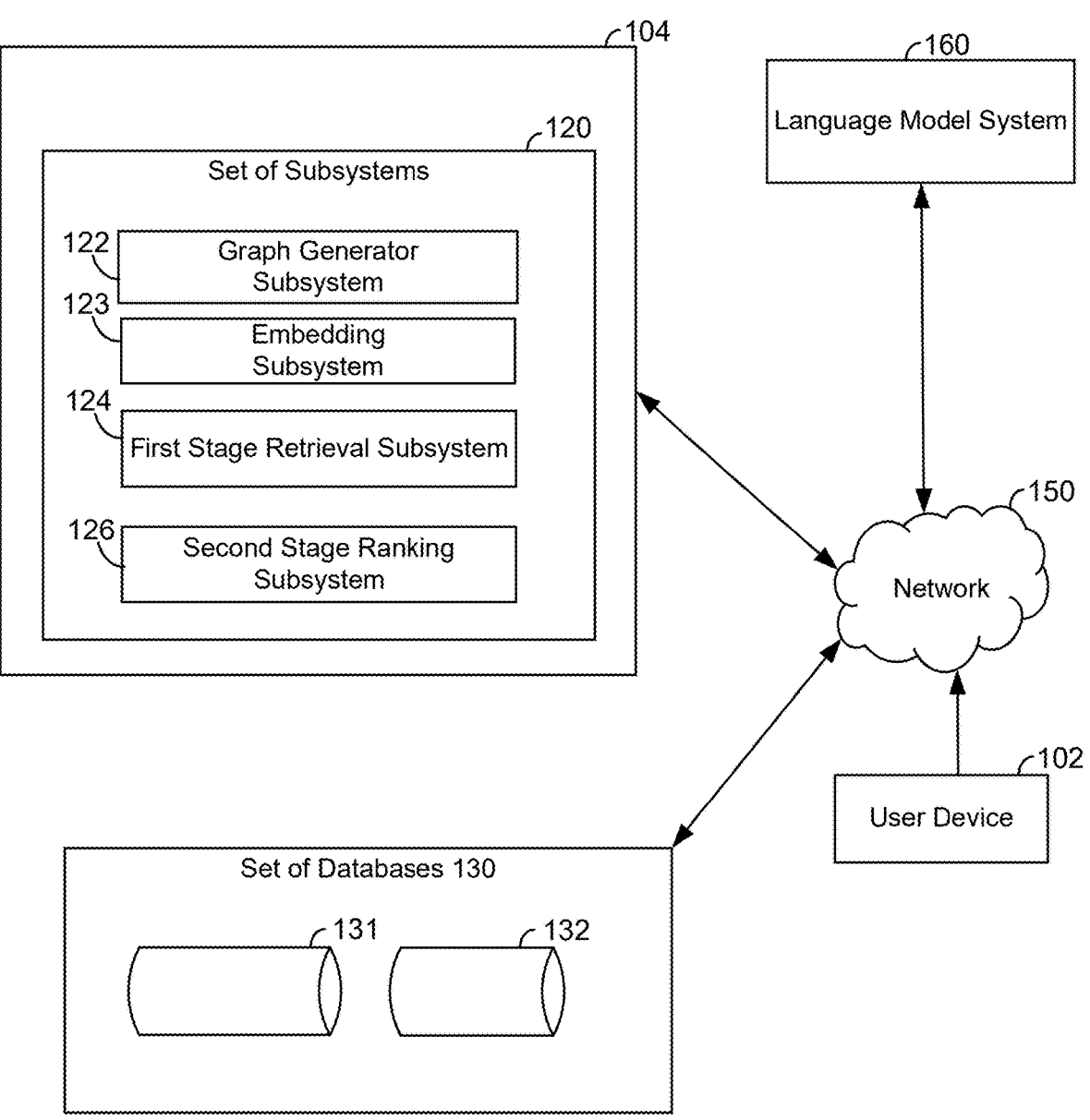
FIG. 1 illustrates an example system for increasing relevant content transmission when using a language model, in accordance with an implementation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

A significant issue with some RAG systems is that, during the retrieval stage, retrieval methods may fail to identify the most relevant documents. For example, retrieval methods based purely on keyword matching or vector space models may struggle to capture the nuanced semantic relationships between queries and documents. This limitation can result in the retrieval of documents that are only superficially relevant or the creation of a document list that misses crucial information. A failure to identify the most relevant documents can result in a corresponding failure to incorporate them in the input context with a prompt. Such a failure can then cause a language model provided with such an input to be misleading, suboptimal, or inaccurate.

Some embodiments may resolve these issues and related issues by performing operations to increase the efficiency of data retrieved for input context in a prompt by using a set of graph neural networks to both retrieve and rank a set of documents or other data for inclusion in a prompt context. Furthermore, the operations to retrieve data for input context for a prompt may increase the relevancy or information accuracy of the retrieved documents, thereby increasing the accuracy and explainability of output generated from the prompt.

In many cases, content may be stored across a distributed network of different servers or other electronic devices. For example, some embodiments may store a distributed graph system innate networked plurality of servers, where the first server may store a first set of content graphs, and where the second server may store a second set of content graphs. Some embodiments may then receive a natural language prompt from a client device and perform operations to generate a query graph based on the natural language prompt. By generating the query graph from the prompt, some embodiments may allow the use of graph-based networks to search for content relevant to the prompt with greater efficiency, accuracy, and scalability. After generating the query graph, some embodiments may use the query graph as an input for a first graph neural network to retrieve content graphs and use a second neural network to determine which of the retrieved content graphs to include in an input context to increase the accuracy of output.

Some embodiments may generate query graph from the user prompt or other text sequence and use this query graph to retrieve a set of content graphs with the use of a first graph neural network. For example, a computer system may use a first server to retrieve a first graph subset from a first set of graphs stored on the first server and use a second server to retrieve a second graph subset from a second set of graphs stored on the second server. By using graph neural networks to retrieve graph-based data from multiple servers, some embodiments may take advantage of parallelism, scalability and other advantages of graphics processing units (GPUs) or tensor processing units (TPUs). Furthermore, a graph neural network can analyze graphs that encode relationships between different portions of a document based on a query graph, increasing the likelihood of retrieving documents having greater content relevancy with the query graph. After a computer system retrieves an intermediate set of graphs using the first graph neural network, some embodiments may then rank or re-rank the retrieved graph data and then present the graph data.

Some embodiments may use multiple graph neural networks to refine the input context accompanying a prompt for a generative AI input. For example, a computer system may retrieve an intermediate set of graphs by searching one or more databases with a retriever graph neural network. In some embodiments, the computer system may then use a second graph neural network to re-rank similarities between the query graph and the intermediate set of graphs to select a ranked graph subset, such as by selecting graphs of the ranked graph subset that satisfies a threshold. In some embodiments, the first and second graph neural networks may be configured with different sets of hyperparameters such that the second graph neural network may be configured with greater fidelity, edge measurements, or detail than the first graph neural network. By applying a separate ranking stage after retrieving an intermediate set of graphs with a first graph neural network, a computer system may be able to detect deeper token relationships that would have not been detected by the first graph neural network. Furthermore, by using two separate graph neural networks, a computer system may apply different criteria for relevance as measured by graph metrics (e.g., number of related nodes, distances between nodes, etc.), ensuring that multiple types of graph metrics are applied.

Some embodiments may augment a prompt with an input context to increase the accuracy or relevancy of a language model output that was generated by a language model in response to being provided with the prompt. After using a set of graph neural networks to select an intermediate set of graphs and then filter the intermediate set into a ranked graph subset based on similarities with a query graph, some embodiments may then retrieve the data mapped to or otherwise associated with the ranked graph subset. For example, after selecting a first graph and a second graph, some embodiments may retrieve a first document from a first server and a second document from a second server based on a detected mapping between the first document with the first graph and between the second content with the second document. A computer system may then generate an input context that includes this first document and second document and then provide this input context in conjunction with the user prompt to a large language model. By providing this enriched input that includes content retrieved with a two-stage graph neural network retrieval and ranking operation, the output of a neural network may be more accurate and may be tracked back to specific set of sources.

For example, FIG. 1 illustrates an example system 100 for increasing relevant content transmission when using a language model, in accordance with an implementation. In brief overview, the system 100 can include a client device 102, a set of servers 104, a set of storage 130, or a language model system 160, where such components may communicate over a network 150. The client device 102, the set of servers 104, or another computer system described in this disclosure can each include one or more aspects or features described elsewhere herein, such as in reference to the computing environment 500 of FIG. 5. The client device 102 or the set of servers 104 may include an on-premises computing device, a desktop computer, a laptop computer, a wearable headset, a smartwatch, another type of mobile computing device, a transaction device, some combination of the above devices, etc. In some embodiments, computing devices shown in the system 100 may communicate with various other computing devices via the network 150, where the network 150 may include the internet, a local area network, a peer-to-peer network, etc. The client device 102 may send and receive messages through the network 150 to communicate with a set of servers 104, where the set of servers 104 may include a set of non-transitory storage media storing program instructions to perform one or more operations of subsystems 122-124.

In some embodiments, the set of servers 104 may include a single computing device to perform operations such as generating graphs, generating embeddings or other representations, retrieving content, ranking graphs, etc. Alternatively, or additionally, the set of servers 104 may include multiple computing devices acting as part of networked set of computers or a decentralize computer system. The set of servers 104 can be configured to execute an application to perform one or more operations described in this disclosure. For example, the client device 102 may send instructions to the set of servers 104 that effectuates a set of database transactions which updates records of a set of databases 130, such as updating a first record of the first database 131 and a second record of the second database 132. As used in this disclosure, an embedding may include a vector that represents discrete objects, entities, concepts, etc. Various types of data may be used to generate embeddings, such as graphs, documents or other text data, image data, audio data, video data, multi-modal data, etc.

While one or more operations are described herein as being performed by particular components of the system 100, those operations may be performed by other components of the system 100 in some embodiments. For example, one or more operations described in this disclosure as being performed by the set of servers 104 may instead be performed by the client device 102. Furthermore, some embodiments may communicate with an application programming interface (API) of a third-party service via the network 150 to perform various operations disclosed herein. For example, some embodiments may provide input to an API of a large language model service to obtain a language model output.

In some embodiments, the set of computer systems and subsystems illustrated in FIG. 1 may include one or more computing devices having electronic storage or otherwise capable of accessing electronic storage, where the electronic storage may include the set of databases 130. The set of databases 130 may include values used to perform operations described in this disclosure. For example, the set of servers 104 may store a content-related data in the set of databases 130. For example, the set of databases 130 may be a set of databases within a network plurality of servers, where the first database 131 may be a database for a first server and the second database 132 may be a database for a second server. In some embodiments, the first database 131 and the second database 132 may form portions of a distributed graph system.

In some embodiments the system 100 may perform operations to include, in an input context for an input of a language model, additional relevant information that may help increase the accuracy of an output. For example, the system 100 may retrieve relevant content from a distributed graph that is distributed across a group of networked systems storing one or more graph databases or content related to the graph databases. For example, some embodiments may store a set of databases 130 that includes a first graph a first database 131 and a second database 132.

In some embodiments, the set of servers 104 may use a graph generator subsystem 122 for transforming content data, query data, or other data into one or more graphs. For example, the set of servers 104 may provide a first content subset (e.g., a first set of documents, program source code, other content) to the graph generator subsystem 122 to generate a first set of content graphs that are then stored in the first database 131. The set of servers 104 may also provide a second content subset to the graph generator subsystem 122 to generate a second set of content graphs that are then stored in the second database 132. In some embodiments, the set of servers 104 may reserve use of the graph generator subsystem 122 for content that has been selected as being sufficiently relevant to a query embedding. For example, some embodiments may determine that the similarity metrics between a first document-level embedding of a candidate document generated from providing documents to a neural network encoder and a query embedding generated from providing a query to the neural network encoder satisfies a similarity threshold (e.g., is sufficiently similar). In response, some embodiments may generate a graph based on the candidate document.

Some embodiments may use the embedding subsystem 123 to perform embedding operations on graphs generated by the graph generator subsystem 122. In some embodiments, the embedding subsystem 123 may include a graph embedding subsystem to generate one or more embeddings from graphs or content provided to the subsystem 123. For example, the embedding subsystem 123 may include a graph neural network convert graph data into embeddings. Alternatively, or additionally, the embedding subsystem 123 may include a neural network or other machine learning model to convert documents or other content data into a set of embeddings.

In some embodiments, the generated graphs and corresponding graph embeddings may be stored in a distributed graph system that is distributed amongst multiple databases. For example, the set of servers 104 may store a first set of content graphs and a corresponding set of graph embeddings generated from the first set of content graphs in the first database 131. The set of servers 104 may then store a second set of content graphs and a corresponding second set of graph embeddings generated from the second set of content graphs in the second database 132.

In some embodiments, content may be distributed in accordance with categories associated with that content for different databases. Alternatively, or additionally, different portions of a graph system in different databases and across different servers to increase search scalability or increase data resilience. Furthermore, the graphs or embeddings generated from the graphs may be mapped to or otherwise associated with the original content used to generate those graphs or associated embeddings. For example, after generating a first set of graphs from a first set of content, the set of servers 104 may store a first set of embeddings generated from that first set of graphs into the first database 131 and further store the first set of graphs and the first set of content in the first database 131. Additionally, the set of servers 104 may update indices, pointers, links, or other mappings to associate the first set of embeddings and the first set of graphs with the first set of content.

In some embodiments, the client device 102 may send a message that includes a natural language query or other query to the set of servers 104 via the network 150. After receiving the message, the set of servers 104 may provide the natural language query or other query to the graph generator subsystem 122 to generate a query graph and then provide the query graph to the graph embedding subsystem 123 to generate a query graph embedding.

Some embodiments may use a first stage retrieval subsystem 124 to determine what content to retrieve from the set of databases 130 at a first retrieval stage. In some embodiments, the first stage retrieval subsystem 124 may include a graph neural network to compare similarities based on embedding models. Alternatively, in cases where the embedding subsystem 123 is not used, the first stage retrieval subsystem 124 may use a graph neural network to generate embeddings, where the first stage retrieval subsystem 124 may also use another graph neural network to compare embeddings to determine initial similarities and detect an intermediate set of representations (e.g., an intermediate set of graphs).

Some embodiments may use the first stage retrieval subsystem 124 to search through a set of graph databases to retrieve an intermediate set of graphs indicated to be sufficiently similar to the query graph. For example, the first stage retrieval subsystem 124 may search through each graph or graph embedding stored in the first database 131 and the second database 132 to detect similarities with a query graph or query graph embeddings generated from the query graph. When retrieving graphs or data derived from graphs under constrained computer resources or network resources, the first stage retrieval subsystem 124 or another component of the system 100 may determine or prioritize databases for content graph selection.

In some embodiments, the first stage retrieval subsystem 124 may forego the use a graph neural network to instead detect similarities based on embeddings generated by directly providing a document or other content to an encoder model. For example, some embodiments may use the embedding subsystem 123 to apply a transformer model to a document to generate a first set of embeddings and then use the first stage retrieval subsystem 124 to directly compare the first set of embeddings with embeddings generated from queries.

Some embodiments may use a second stage ranking subsystem 126 to compute similarities and perform ranking operations, where ranking operations may include reranking operations. In some embodiments, the second stage ranking subsystem 126 may execute or otherwise use a graph neural network that is deeper and may detect more features or graph connections than a graph neural network used by the first stage retrieval subsystem 124. For example, the second stage ranking subsystem 126 may use a graph neural network to determine similarities between the query graph generated from a query provided by the client device 102 and content graphs generated by the graph generator subsystem 122. In cases where the embedding subsystem 123 is not used to generate an embedding for the second stage ranking subsystem 126, the second stage ranking subsystem 126 may use one or more graph neural networks to generate graph embeddings.

In some embodiments, the second stage ranking subsystem 126 may use graph embeddings generated from graph neural network to determine similarities. For example, the second stage ranking subsystem 126 may compare a set of content graph embeddings with a query graph embedding to determine distances in embedding space. The set of content graph embeddings may be generated by a graph neural network that is provided with content graphs, and the query graph embedding may be generated by the graph neural network provided with a query graph. The second stage ranking subsystem 126 may then select content graphs based on the distances of their corresponding graph embeddings in the embedding space from the query graph embedding. The second stage ranking subsystem 126 may select the most similar (i.e., least distance) graphs in the embedding space and then retrieve content mapped to the selected graphs.

Alternatively, the second stage ranking subsystem 126 may use the graph embeddings as inputs for as second graph neural network used by the second stage ranking subsystem 126 in a hierarchical fashion. For example, some embodiments may provide both the initial graph embeddings generated from a graph neural network and the full structure of a content graph to determine a final content graph value and select the content graphs determined to be most similar to a query based on a corresponding query graph embedding and query graph. By using a hierarchical multi-graph-neural-network approach, some embodiments may further increase the likelihood of retrieving relevant content.

Some embodiments may use the second stage ranking subsystem 126 to re-rank similarities between the intermediate set of graphs and the query graph. In some embodiments, the re-ranking graph neural network may be configured to detect a greater number of nodes or connections between nodes, where the computational resources involved in these detections may be significantly greater than those involved when using retriever graph will network. For example, a second graph neural network used by the second stage ranking subsystem 126 may have a different architecture from a first graph neural network used by the first stage retrieval subsystem 124, where the second graph neural network may include attention mechanisms that made be able to better process important aspects of a graph. Alternatively, or additionally, the second graph neural network may include a greater degree of granularity with respect to a max pooling parameter or more sophisticated methods such as including differentiable pooling to summarize a graphs structure.

With respect to hyper parameters, a second graph neural network of the second stage ranking subsystem 126 may include parameters that include a greater number of neural network layers than a graph neural network of the first stage retrieval subsystem 124, a greater number of neural units than the graph neural network of the first stage retrieval subsystem 124, etc. The inclusion of a greater number of neural network layers or a greater number of neural units within a neural network layer may increase the ability to detect similarities and graphs but also increase computation resource use.

Some embodiments may use a second graph neural network used by the second stage ranking subsystem 126 to rank or re-rank (if the first stage retrieval subsystem 124 had already bene used for ranking operations) an intermediate set of graphs selected by the first stage retrieval subsystem 124. This ranking or re-ranking operation may be based on a similarity with a graph query generated from a message provided by the client device 102. For example, some embodiments may provide a query graph and an intermediate set of graphs generated by the first stage retrieval subsystem 124 to a second graph neural network of the second stage ranking subsystem 126. The second stage ranking subsystem 126 may use this second graph neural network to determine a set of similarity metrics between the query graph and the graphs of the intermediate set of graphs.

In some embodiments, the second stage ranking subsystem 126 may apply a threshold to determine a ranked representation subset (e.g., a ranked graph subset). In some embodiments, the threshold may be based on a number of representations (e.g., graphs, vectors, etc.), a minimum similarity, a maximum amount of content data corresponding with the ranked graph subset, or another value. The set of servers 104 may then select content data from one or more data sources (e.g., databases of the set of databases 130) based on the corresponding representation in the ranked representation subset. For example, the second stage ranking subsystem 126 may select content to which graphs of a ranked graph subset is mapped, where the selected content may then be used as part of an input sent to the language model system 160. Furthermore, in cases where the selected graphs of a ranked graph subset include graphs distributed across multiple nodes of a network, some embodiments may retrieve the selected content associated with the ranked graph subset form a plurality of nodes (e.g., from the set of databases 130) and aggregate the selected content into an input context for the language model system 160.

In some embodiments, the distributed nature of a graph database may be used to accelerate graph retrieval, ranking, or other operations described in this disclosure. For example, a network system may use a first server to retrieve a first graph subset using a version of a first graph neural network and rank the first graph subset using a version of a second graph neural network. The first server may use a first set of processors available to the first server to perform these operations. The network system may concurrently use a second server to retrieve a second graph subset using another version of the first graph neural network and then rank or re-rank the second graph subset with a second graph neural network. By distributing the work of using graph neural networks, some embodiments may parallelize operations and increase search operations. Furthermore, some embodiments may perform local versions of content retrieval operations based on the search operations without transferring content between servers after determining local rankings and instead merely communicating graph identifiers and similarity values. In some embodiments, a computer system may determine a local ranked graph subset is generated using local versions of each server or set of processors being used to perform ranking operations. Some embodiments may reduce network traffic in a distributed network by then determining a final ranked graph subset by comparing the similarity scores of each graph and selecting the graph.

By separating initial graph retrieval from downstream more-refined similarity determination operations, some embodiments may benefit from different focuses the use of two separate graph neural networks. For example, the set of servers 104 may use the first stage retrieval subsystem 124 to perform a rougher similarity retrieval operation to retrieve an intermediate set of graphs, where each respective graph of the intermediate set of graphs has a threshold amount of similarity with a query graph. By using a graph neural network to perform initial retrieval operations, some embodiments may already use structural-awareness inherent in a graph neural network's ability to process graph topology. Furthermore, graph-based structures may be able to better handle permutations in the order of nodes that, in the context of natural language documents, may indicate that the substance of two different messages are the same or similar. Additionally, a computer system using a graph neural network for retrieval operations may be able to detect hierarchical features in a way that traditional neural networks or other machine learning models may fail to detect. Furthermore, a computer system using two different graph neural networks for retrieval and ranking operations (or re-ranking operations if the retrieval operations also include ranking operations) may configure the graph neural networks or train the graph neural networks to focus on different types of connections or different types of nodes when determining similarities. Such differences may increase the likelihood that both required nodes are detected but certain node connections or sets of connections are more favored.

Some embodiments may then generate an input context for an input, where the input context includes a content used to generate the graphs in the ranked graph subset determined from the use of a second-stage graph neural network of the second stage ranking subsystem 126. For example, some embodiments may use the second-stage graph neural network to select a set of three graphs in a ranked graph subset based on the similarity values between these three graphs and a graph query. Some embodiments may then collect the content used to generate these three graphs and generate a query augmentation context that includes this content or another type of input context that includes this content. Some embodiments may then transmit, as an input, content use to generate the three graphs, where some embodiments may have initially mapped the three graphs to the content or re-create the content based on the three graphs. The set of servers 104 may then send an input that includes the query augmentation context and the original natural language query provided by the client device 102 to the language model system 160, where the language model system 160 may include a large language model (e.g., a transformer-based large language model) or an application program interface a third-party large language model. The language model system 160 may then provide a language model response, where the language model response may then be sent back to the client device 102 to be displayed by the client device 102.

Some embodiments may retrieve an intermediate set of graphs with the graph neural network based on similarity scores and a similarity threshold (e.g., a minimum similarity threshold). For example, some embodiments may first generate a query graph by providing a query from the client device 102 to the graph generator subsystem 122 and then generate a query graph embedding by providing the query graph to the graph embedding subsystem 123. Some embodiments may also generate a set of content graph embeddings by providing content stored in the set of databases 130 to the graph generator subsystem 122 and providing the resulting content graphs to the graph embedding subsystem 123. It should be understood that a distributed system including a distributed network may perform these operations at a local node and store the output data in another node or in the same node. For example, a first server may provide a first set of content to a local version of the graph generator subsystem 122 to generate a first set of content graphs and use a local version of the graph embedding subsystem 123 to generate a first set of graph embeddings from the first of content graphs. A second server may provide a second set of content to another local version of the graph generator subsystem 122 to generate a second set of content graphs and use another local version of the graph embedding subsystem 123 to generate a second set of graph embeddings from the second set of content graphs.

Some embodiments may then determine similarity scores based on the set of content graph embeddings and compare these values to similarity threshold apply another set criteria (e.g., within a similarity region, within the top N most similar embeddings where N is an integer, etc.). For example, some embodiments may compare embeddings based on their respective distance in an embeddings space and selecting an intermediate set of graphs. Some embodiments may select the intermediate set of graphs based on a determination that, for each respective graph in the intermediate set of graphs, the respective distance between the respective graph and the central graph is less than a similarity threshold at the first retrieval stage of a graph-based RAG process ("first stage minimum similarity threshold"). In some embodiments, the set of servers 104 may generate multiple sets of content graph embeddings corresponding with multiple servers or nodes of a network and select local graphs based on a shared set of criteria, such as having a similarity that satisfies the first stage minimum similarity threshold. In some embodiments, the set of servers 104 may aggregate the graphs retrieved using the first graph neural network for use as a final intermediate set of graphs before then providing this final intermediate set of graphs to a second-stage graph neural network of the second stage ranking subsystem 126. Some embodiments may distribute versions of the second-sage graph neural network to multiple nodes to rank respective sets of graphs and determine which sets of content to include in an input context.

In some embodiments, retrieving graph subsets with graph neural networks or ranking graph subsets with graph neural networks may include the use of a set of graphics processing units (GPUs) or a set of tensor processing units (TPUs). A GPU may include a specialized circuit having streaming multiprocessors with shared memory hierarchies and high-bandwidth memory optimized for single instruction multiple thread execution. A TPU may include specialized circuitry having dedicated scalar, vector, and matrix processors optimized for mixed-precision calculations. For example, the set of servers 104 may use a first set of GPUs of a first server when executing a version of the graph embedding subsystem 123 when determining a first set of graph embeddings and then determining a first portion of an intermediate set of graphs. The set of servers 104 may concurrently use a second set of GPUs of a second server when executing a version of the graph embedding subsystem 123 when determining a second set of graph embeddings and then determining a second portion of the intermediate set of graphs. By using specialized GPUs or TPUs, some embodiments may perform graph neural network operations or other operations described in this disclosure with far greater efficiency due to the parallelizability of graph neural network operations.

In some embodiments, retrieving an intermediate set of graphs may include using different query graph embeddings generated from the same query to select one or more graphs for the intermediate set of graphs. For example, the set of servers 104 may generate multiple query graph embeddings from a single natural language query provided by the client device 102 by first providing the natural language query to the graph generator subsystem 122 to generate a query graph and then providing the query graph to both the graph embedding subsystem 123 and the second stage ranking subsystem 126. Furthermore, some embodiments may provide content in the set of databases 130 or other content to the graph generator subsystem 122 to generate a set of content graphs. Some embodiments may then provide the set of content graphs to a second-stage graph neural network of the second stage ranking subsystem 126 to generate an additional set of content graph embeddings. Some embodiments may then select a ranked graph subset based on comparisons between and embedding of the additional set of content graph embeddings and the second query graph embedding generated by the embedding subsystem 123 or the second stage ranking subsystem 126. For example, some embodiments may calculate an additional set of similarity scores based on distances between respective embeddings of the additional set of content graph embeddings and the second query graph embedding and selected a ranked graph subset based on the threshold. After computing the additional set of similarity scores, the set of servers 104 may then rank the additional set of similarity scores to determine a ranked graph subset used to select the content used for an input context.

In some embodiments, content graphs may be generated as lossy graphs. Alternatively, some embodiments may generate content graphs using a lossless operation to generate a lossless set of graphs. For example, some embodiments may use a version of the graph generator subsystem 122 to generate a first lossless set of graphs based on first content stored in a database of the first server and generate a second lossless set of graphs based on second content stored in a database of the second server. In the case where one or more lossless graphs are selected to be part of a ranked graph subset corresponding with content to be included in an input context, the set of servers 104 or another computer system may perform operations to reconstruct content (e.g., text data, image data, audio data, video data, etc.) from the lossless graph.

In some embodiments, a lossless operation may include a universal dependencies operation, such as a transformation that preserves graph structure, graph semantics, and includes the use of by objective mappings and reversible transformation functions. In some embodiments, the lossless operation may include an abstract meaning representation operation, such as an operation that converts a natural language (e.g., a natural language query, a natural language document, a natural language transcript, etc.) into a directed, acyclic graph structure, such as one in which nodes represent concepts and edges represent semantic relationships between the concepts. In some embodiments, the lossless operation may include an abstract syntax tree operation, such as an operation that transform the structure of content or another graph by changing hierarchical tree representations of the syntax of the content or other graph.

In some embodiments, the content used to generate a graph may be stored in a different database or different type of database from the generated graph. For example, the set of servers 104 may retrieve a document from a relational database and provide the document to the graph generator subsystem 122 to generate a content graph. The set of servers 104 may then store the content graph in a graph database separate from the relational database. In some embodiments, the set of servers 104 may generate or maintain an association between the content graph and the document, such that a retrieval of the content graph or an embedding generated from the content graph may also permit the retrieval of the document.

In some embodiments, after receiving a natural language query or other message from the client device 102, the set of servers 104 may perform one or more operations described in this disclosure to retrieve relevant content from the set of databases 130. The set of servers 104 may then provide this relevant content to the language model system 160 to obtain a response that is provided in real time or near real time. In some embodiments, a real time response includes a response that is provided at least in part in 10 seconds or less. In some embodiments, a near real time response includes a response that is provided at least in part in one minute or less. For example, after receiving a message from the client device 102, the set of servers 104 may perform operations described in this disclosure to obtain a response from the language model system 160. The set of servers 104 may then send at least a portion of the response to the client device 102 within five seconds of receiving the message. The response provided by the language model system 160 may then be sent to the client device 102, the set of servers 104, or another computer system.

FIG. 2 illustrates an example process for increasing relevant content transmission when using a language model, in accordance with an implementation. Some embodiments may store content representations in a set of databases, as described by block 204. A content representation may a set of graphs, a set of embeddings or other vectors, or other data derived from the content. For example, a content representation may include a graph generated with content, an embedding of the graph, an embedding generated from the content, etc. Some embodiments may store content such as documents, articles, captions, annotations, transcripts, or other text data in a relational database as part of content. Some embodiments may also store graphs generated from the content or embeddings generated from the content in a set of databases. For example, some embodiments may generate a set of graphs from a first set of content, where each respective graph of the set of graphs maps to or is otherwise associated with the first set of content, and then store this set of graphs in a graph database. Alternatively, or additionally, some embodiments may provide the first set of content to a neural network encoder to generate a set of embeddings (e.g., by using trained embedding models such as word2vec, Global Vectors, FastText, etc.) or another neural network embedding model (e.g., a transformer-based model such as the GPT family of models, T5, XLNet, etc.). Some embodiments may further generate a document-scale embedding based on these embeddings, such as by combining these embeddings, providing the output embeddings an encoder model, etc. Some embodiments may then store these embeddings or document-scale embeddings in a database for comparison operations. Furthermore, when storing content representations, some embodiments may store content representations in multiple databases, such as multiple databases of servers. For example, some embodiments may store first content representations in a first server and second content representations in a second server.

In some embodiments, content representation generated from content may be or may include document-level embeddings. A document-level embedding may be or may include a vector representation that indicates a semantic meaning or content for an entire document. For example, when storing documents, some embodiments may provide a first set of documents to a neural network encoder model to generate the document-level embeddings. Alternatively, or additionally, some embodiments may use other machine learning models to generate an embedding based on content.

Some embodiments may store content representation in a vector database representing graph embeddings in a random or pseudorandom process. A truly random process may include measurements of a physical phenomenon while a pseudorandom process may include operations to use one or more pseudorandom algorithms to generate a pseudorandom value. By storing content in a random or pseudorandom fashion, or otherwise storing content in an un-ordered fashion, some embodiments may increase the data storage rate, where such increases in storage rate may be important for situations in which content is voluminous and may require regular updates. Furthermore, in cases where a database is distributed, different content representations may be stored in different vector databases. For example, some embodiments may store a first set of content representations in a first vector database and store a second set of content representations in a second vector database.

Some embodiments may generate a query representation based on an obtained query, as described by block 208. Some embodiments may obtain a natural language query or another type of prompt from a client device. A query representation may include one or more types of data derived from a query, such as a graph, embedding, etc. For example, some embodiments may obtain a natural language query from a user and generate a query graph from the natural language query for use as a query representation.

In some embodiments, a query representation may include an embedding generated based on a query. Some embodiments may directly generate an embedding from the query. For example, some embodiments may generate a query representation from a query by providing, to an encoder model that includes a neural network encoder, a query representation. Alternatively, or additionally, some embodiments may generate graph embeddings from a query graph for use as query representations.

Some embodiments may retrieve an intermediate set of representations from a set of databases using a first graph neural network, as described by block 212. Some embodiments may generate a set of graphs by providing a set of content to a graph generator and use the graphs as a set of content representations. Some embodiments may then use a retriever graph neural network to generate an embedding based on the graph representation of the content. For example, some embodiments may provide a first content graph to a trained retriever graph neural network to generate additional graphs. Some embodiments may then perform a vector similarity search operation based on the graph embeddings to determine which graph embeddings are closest in the embedding space to the embedding generated from a query graph.

As described elsewhere in this disclosure, some embodiments may generate embedding vectors directly from a query and from a set of contents without generating graphs. For example, some embodiments may provide a set of documents to a neural network embedding model to generate a set of document-scale embedding vectors some embodiments may then provide a natural language query to the neural network embedding model to generate a query embedding. Some embodiments may then perform a vector similarity search operation to determine a set of nearest vectors to the query embedding.

Some embodiments perform clustering operations in an embedding space or other representations in space for content. For example, some embodiments may determine one or more clusters of content representation in order to select one or more queries, where the one or more clusters may be or include one or more clusters of content representations (e.g., clusters of graph embeddings, clusters of document-level embeddings, etc.). For example, some embodiments may generate multiple vector clusters by performing clustering operations on content representations, such as document-level embeddings or graph embeddings. Some embodiments may then reduce the amount of computation time by taking advantage of these pre-defined clusters and assign all of the embeddings or other representations of a cluster as part of an intermediate set of representations if the cluster is the closest cluster to a query representation. For example, between a first cluster, second cluster, and third cluster, if the second cluster is closest to a query embedding, some embodiments may include each embedding in an intermediate set of representations that will later be used to select content for an input context. Some embodiments may determine the distance (e.g., as a part of performing a vector similarity search algorithm) between a cluster and a vector by determining a distance between a centroid of the cluster and the vector or a component vector of the cluster and the vector. For example, some embodiments may perform a similarity search on vector database with respect to a query vector (e.g., a query graph embedding) by searching for similar vectors in a vector space that contains vectors stored in the vector database represented as point or nodes as in hierarchical navigable small world (HNSW) algorithm. Some embodiments may determine distances as Euclidean distance, cosine similarity distances, or other distances to determine a set of most relevant documents to query.

In some embodiments, the number of graphs in the intermediate set of representations may be limited. Some embodiments may limit the count of representations (e.g., graph representations of a document) in the intermediate set of representations to an integer parameter, where the integer parameter may be predefined in a configuration file, entered into a user interface, retrieved from a database, etc. By limiting the count of representations in the intermediate set of representations, some embodiments may reduce the load performed by downstream ranking operations.

Some embodiments may select a graph subset for an input context by ranking intermediate set of representations based on similarity values, as described by block 216. Some embodiments may select a graph subset that is then used to determine what content to retrieve for an input context. Some embodiments may select content to include in an input in two stages, where the first stage includes a retrieval stage (e.g., a retrieval stage that includes one or more operations described for block 212) and a may also include ranking or re-ranking stage. During the re-ranking stage, some embodiments may use a ranking graph neural network that is different from a retriever graph neural network used during one or more operations described for block 212. The ranking graph neural network may include more layers, more neural units, or additional features (e.g., an attention feature) that is not present in a retriever graph neural network. These additional features, neural network layers, or neural units may permit the ranking graph neural network to determine degrees of similarities and relationships between query graphs and content graphs that would not be detected by the ranking graph neural network.

In some embodiments, the intermediate set of representations generated by operations for block 212 may have been generated from embedding vectors without generating graphs. In such situations, some embodiments may first generate graphs from content associated with the intermediate set of representations.

In some embodiments, as described elsewhere in this disclosure, an intermediate set of representations may include an intermediate set of graphs. Some embodiments may use the intermediate set of representations (e.g., intermediate set of graphs) when ranking graphs to detect which content mapped to the ranked graphs should be included in an input context. For example, some embodiments may determine which graphs are mapped to the intermediate set of graphs. Some embodiments may then provide, as a set of graph neural network inputs, these graphs to a ranking or re-ranking graph neural network that has been trained to rank similarities between an input graph to determine a set of similarity values and rank this set of similarity values. In some embodiments, the similarities may represent content relevancies such that a greater similarity represents a greater degree of relevancy. For example, some embodiments may determine that a content graph and a query graph are similar based on a determination that the distance between their respective graph embeddings satisfies a set of criteria (e.g., the distance is less than a distance threshold, the distance is the least amongst graph embedding distances from the query graph embedding, etc.). The ranking or re-ranking graph neural network may then output one or more graphs or content identifiers that may be mapped to or otherwise traced to a set of content.

Some embodiments may retrieve content associated with the selected graph subset to generate input context, as described by block 220. In some embodiments, content may be mapped to or otherwise associated with a set of graphs or set of graph embeddings. Some embodiments then retrieve content mapped to or otherwise associated with a graph subset. For example, after determining that a ranked graph subset includes three graphs, some embodiments may access a graph database storing the three graphs and retrieve a set of links pointing to a respective three documents in the same database or another database. Some embodiments may then retrieve the three documents for use in an input context.

Some embodiments may determine the size of an input context based on a window context of a downstream language model to be used. For example, if the context window of a downstream large language model is 100 tokens, some embodiments may then limit the input context to be equal to the difference between 100 tokens and the number of tokens consumed by a user prompt that will then be provided as part of an input.

Some embodiments may provide an input that includes the retrieved content to a language model to obtain model output, as described by block 224. Some embodiments may generate an input that includes a prompt and an input context, where the input context includes data from content retrieved using one or more operations described for block 220. For example, some embodiments may have previously retrieved three documents based on an association between the three documents and the ranked set of graphs. Some embodiments may then generate an input that includes a prompt (e.g., an obtained query such as one described for block 208) and an input context that includes the text of the three documents. Some embodiments may then provide this input to a large language model (e.g., by sending the input to an API of the large language model) to obtain a model output.

Some embodiments may execute downstream action based on model output, as described by block 228. In some embodiments, the downstream action may be to display the model output on a client display device. Alternatively, in the case where the model output includes program instructions or source code, the downstream action may be to execute at least a portion of the model output.

Figure 3:
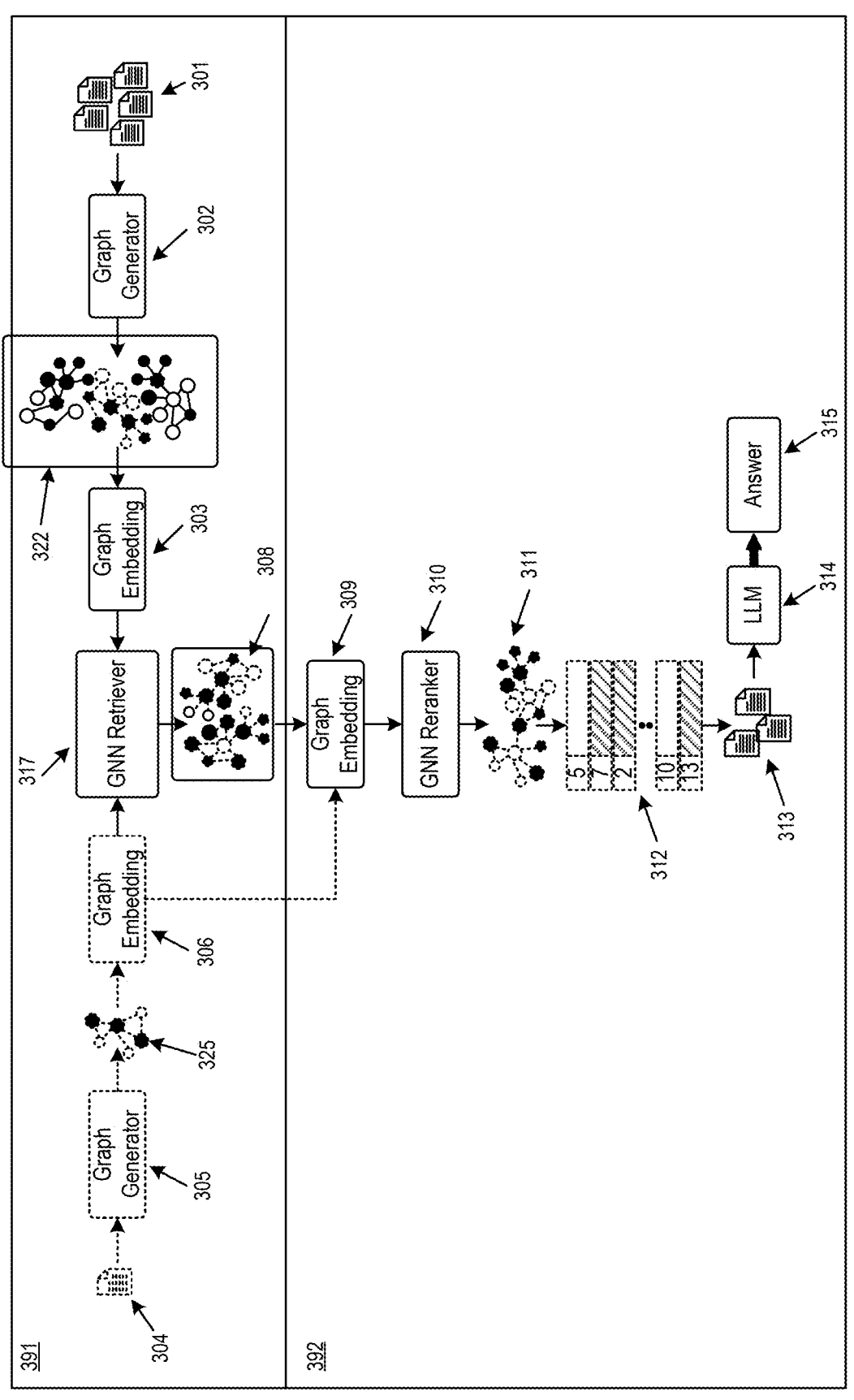
FIG. 3 illustrates a two-stage graph neural network sequence for increasing relevant content transmission when using a language model, in accordance with an implementation.

FIG. 3 illustrates a two-stage graph neural network sequence for increasing relevant content transmission when using a language model, in accordance with an implementation. In a first stage 391, some embodiments may use a first graph neural network to determine similarity scores between a query 304 and the content 301, where the content 301 may include documents or other text data, audio data, video data, other data). In some embodiments, the content 301 may be stored in a relational database, noSQL database, or other type of database. Furthermore, some embodiments may store the content 301 across a distributed network, where different nodes of the distributed network may perform operations described in this disclosure.

Some embodiments may provide the content 301 to a graph generator 302 to generate a set of graphs 322, where the set of graphs 322 may then be stored a graph database or multiple graph databases. For example, some embodiments may store a graph in the set of graphs 322. In the form of vectors that include the units "[node id|numerical values]." Some embodiments may store the graph in this form or a similar form to create representations that are suitable for a graph neural network input format. Some embodiments may generate and store the graphs in a lossless form, such that some embodiments could use the set of graphs 322 to reconstruct documents in the content 301 without having access to the original documents. Graphs from the set of graphs 322 may then be provided to a graph embedding subsystem 303.

In some embodiments the query 304 may be provided to a graph generator 305, where the graph generator 305 may be similar to or the same as the graph generator 302. For example, the graph generator 305 may produce a query graph 325 that can be stored as vectors in the format "[node id|numerical values]." Some embodiments may then provide the query graph 325 to a graph embedding subsystem 306, where the subsystem 306 may be similar to are the same as the graph embedding subsystem 303. In some embodiments, a retrieval subsystem 317 may then consume both the embeddings generated by the graph embedding subsystem 303 and the graph embedding subsystem 306 to generate similarity scores and determine an intermediate set of graphs 308. Some embodiments may perform an initial ranking operation to determine the K most relevant documents or other content from the content 301, where K may be an integer less than or equal to ten, less than or equal to 50, less than or equal to 100, less than or equal to 1000, less than or equal to 10,000, or less than or equal to another value. For example, in some embodiments, the number of graphs selected for the intermediate set of graphs 308 may include 500 graphs.

In a second stage 392, some embodiments may provide the intermediate set of graphs 308 to a second graph embedding system 309 and a reranking graph neural network subsystem 310 to perform ranking or reranking operations. Furthermore, as described elsewhere, some embodiments may generate a query graph embedding determined based on the query graph 325 and use this query graph embedding as part of the input for the reranking graph neural network subsystem 310 to determine a ranked graph subset. For example, some embodiments may provide the query graph 325 to the second graph embedding system 309 or another graph embedding subsystem to generate a query graph embedding that is in the same embedding space as other graph embeddings to be used in the second stage 392. Some embodiments may then provide the generated embeddings to the reranking graph neural network subsystem 310.

The output of the reranking graph neural network subsystem 310 may include a ranked graph subset 311 or may be used to produce the ranked graph subset 311. The ranked graph subset 311 may then be ranked in accordance with a ranking 312. Some embodiments may retrieve a set of selected content 313, where the set of selected content 313 may map to the ranked graph subset 311. Some embodiments may then use the set of selected content 313 as an input context for an input, where the input may also include the query 304 or another prompt, and then provide the input to a large language model 314 to produce a model output 315. Some embodiments may then send the model output 315 to a client display device to present the model output 315 or data derived from the model output 315. Alternatively, in cases where the model output 315 includes program instructions, some embodiments may execute a script, application, service, or other set of computer operations based on the program instructions provided in the model output 315.

Figure 4:
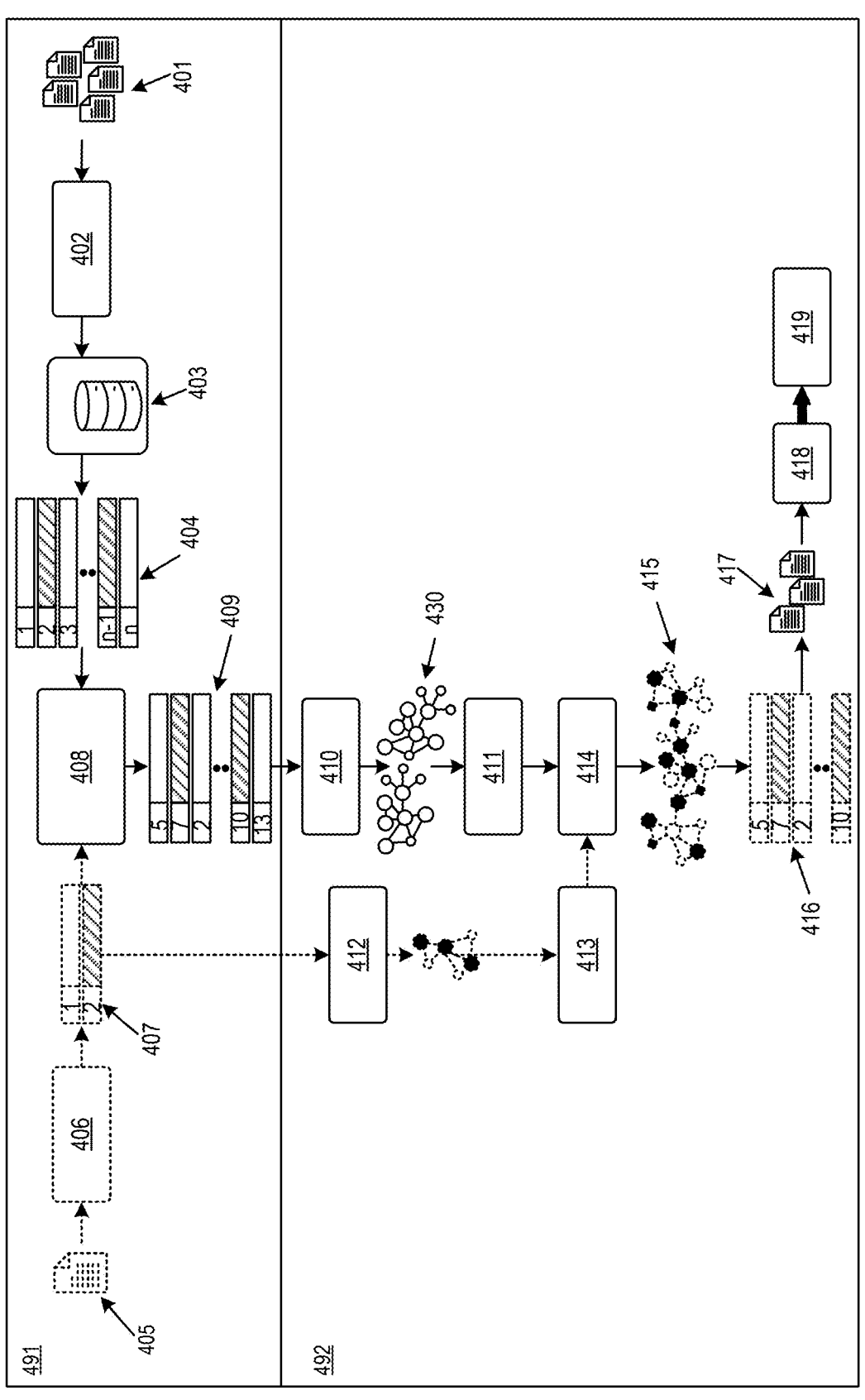
FIG. 4 illustrates an alternative graph neural network sequence for increasing relevant content transmission when using a language model, in accordance with an implementation.

FIG. 4 illustrates an alternative graph neural network sequence for increasing relevant content transmission when using a language model, in accordance with an implementation. In a first stage 491, content 401 may be provided to an embedding model 402, where the vector outputs of the embedding model may then be stored in a vector database 403. In some embodiments, the vectors may be stored in a random or pseudorandom fashion as a collection of vectors 404, where the collection of vectors 404 may be stored in the form "[document id|numerical values]."

Also in the first stage 491, a natural language query 405 provided by a user may be provided to an embedding model 406, where the embedding model 406 may produce a set of query vectors 407. In some embodiments, a vector similarity search retriever subsystem 408 may perform operations determine which of the vectors in the vector database 403 is closest to the set of query vectors 407. For example, the subsystem 408 may apply a vector similarity search algorithm to generate multiple clusters for vectors stored in the vector database 403 based on a distance measurement, such as cosine distance similarity metrics or Euclidean distance similarity metrics. Some embodiments may measure centroid distances from a query vector instead of measuring individual vectors to save computation time. In some embodiments, the subsystem 408 may then be used to determine a top K most relevant set of content (e.g., the greater the similarity, the greater the relevance). In some embodiments, this top K most relevant set of content may act as a first intermediate set of representations 409 that may then be provided to a graph generator for generating a second intermediate set of representations (e.g., an intermediate set of graphs 430).

In a second stage 492, some embodiments may provide the first intermediate set of representations 409 to a graph generator 410 to produce the intermediate set of graphs 430. Some embodiments may then provide the intermediate set of graphs 430 to a graph embedding system 411 and a reranking graph neural network subsystem 414 to perform ranking or reranking operations. Furthermore, some embodiments may provide the set of query vectors 407 to another graph generator 412 to produce a query graph 432 and then provide the query graph 432 to another graph embedding system 413, where the graph embedding system 413 and the system 411 may be similar or the same. Some embodiments may then provide the generated embeddings produced by the graph embedding system 413 and the graph embedding system 411 to the reranking graph neural network subsystem 414, where the reranking graph neural network subsystem 414 may then be used to produce an output.

The output of the reranking graph neural network subsystem 414 may include a ranked graph subset 415 or may be used to produce the ranked graph subset 415. The ranked graph subset 415 may then be ranked in accordance with a ranking 416. Some embodiments may retrieve a set of selected content 417, where the set of selected content 417 may map to the ranked graph subset 415. Some embodiments may then use the set of selected content 417 as an input context for an input, where the input may also include the query 304 or another prompt, and then provide the input to a large language model 418 to produce a model output 419. Some embodiments may then send the model output 419 to a client display device to present the model output 419 or data derived from the model output 419. Alternatively, in cases where the model output 419 includes program instructions, some embodiments may execute a script, application, service, or other set of computer operations based on the program instructions provided in the model output 419.

Computing Environment

Figure 5:
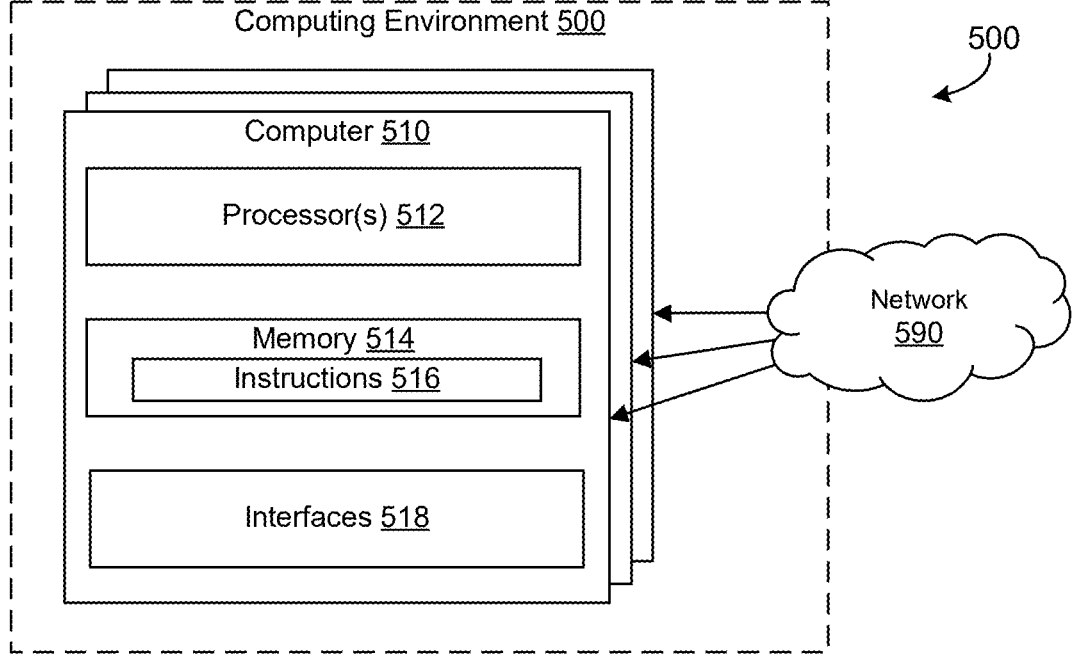
FIG. 5 discloses a computing environment in which aspects of the present disclosure may be implemented, in accordance with an implementation.

FIG. 5 discloses a computing environment 500 in which aspects of the present disclosure may be implemented. A computing environment 500 includes a set of computers

510, where the set of computers 510 may include of one or more virtual or physical computers that individually or in cooperation achieve tasks, such as implementing one or more aspects described herein. The set of computers 510 have components that cooperate to cause output based on input. The set of computers 510 include desktops, servers, mobile devices (e.g., smart phones and laptops), payment terminals, wearables, virtual/augmented/expanded reality devices, spatial computing devices, virtualized devices, other computers, or combinations thereof. In particular example implementations, the computing environment 500 includes at least one physical computer.

The computing environment 500 may specifically be used to implement one or more aspects described herein. In some examples, one or more of the set of computers 510 may be implemented as a user device, such as a mobile device, and others of the set of computers 510 may be used to implement aspects of a machine learning framework usable to train and deploy models exposed to the mobile device or provide other functionality, such as through exposed application programming interfaces.

The computing environment 500 can be arranged in any of a variety of ways. In some embodiments, one or more computers of the set of computers 510 can be local to or remote from other computers of the set of computers 510 of the computing environment 500. In some embodiments, the set of computers 510 may be arranged according to client-server models, peer-to-peer models, edge computing models, other models, or combinations thereof.

In many examples, the set of computers 510 are communicatively coupled with devices internal or external to the computing environment 500 via a network 590. The network 590 is a set of devices that facilitate communication from a sender to a destination, such as by implementing communication protocols. Example network 590 include local area networks, wide area networks, intranets, or the Internet.

In some implementations, the set of computers 510 can be general-purpose computing devices (e.g., consumer computing devices). In some instances, via hardware or software configuration, the set of computers 510 can be special purpose computing devices, such as servers able to practically handle large amounts of client traffic, machine learning devices able to practically train machine learning models, data stores able to practically store and respond to requests for large amounts of data, other special purpose computers, or combinations thereof. The relative differences in capabilities of different kinds of computing devices can result in certain devices specializing in certain tasks. For instance, a machine learning model may be trained on a powerful computing device and then stored on a relatively lower powered device for use.

In some embodiments, one or more computers of the set of computers 510 include one or more processors 512, memory 514, and one or more interfaces 518. Such components can be virtual, physical, or combinations thereof.

The one or more processors 512 are components that execute instructions, such as instructions that obtain data, process the data, and provide output based on the processing. The one or more processors 512 often obtain instructions and data stored in the memory 514. The one or more processors 512 can take any of a variety of forms, such as central processing units, graphics processing units, coprocessors, tensor processing units, artificial intelligence accelerators, microcontrollers, microprocessors, application-specific integrated circuits, field programmable gate arrays, other processors, or combinations thereof. In example implementations, the one or more processors 512 include at least one physical processor implemented as an electrical circuit. Examples of one or more processors 512 may include INTEL, AMD, QUALCOMM, TEXAS INSTRUMENTS, and APPLE processors.

The memory 514 is a collection of components configured to store instructions 516 and data for later retrieval and use. The instructions 516 can, when executed by the one or more processors 512, cause the execution of one or more operations that implement aspects described herein. In many examples, the memory 514 may be one or more non-transitory, machine-readable media, such as random-access memory, read-only memory, cache memory, registers, portable memory (e.g., enclosed drives or optical disks), mass storage devices, hard drives, solid state drives, other kinds of memory, or combinations thereof. In certain circumstances, memory may be transitory and may store information encoded in transient signals.

The one or more interfaces 518 are components that facilitate receiving input from and providing output to something external to the set of computers 510, such as visual output components (e.g., displays or lights), audio output components (e.g., speakers), haptic output components (e.g., vibratory components), visual input components (e.g., cameras), auditory input components (e.g., microphones), haptic input components (e.g., touch or vibration sensitive components), motion input components (e.g., mice, gesture controllers, finger trackers, eye trackers, or movement sensors), buttons (e.g., keyboards or mouse buttons), position sensors (e.g., terrestrial or satellite-based position sensors, such as those using the Global Positioning System), other input components, or combinations thereof (e.g., a touch sensitive display). The one or more interfaces 518 can include components for sending or receiving data from other computing environments or electronic devices, such as one or more wired connections (e.g., Universal Serial Bus connections, THUNDERBOLT connections, ETHERNET connections, serial ports, or parallel ports) or wireless connections (e.g., via components configured to communicate via radiofrequency signals, such as WI-FI, cellular, BLUETOOTH, ZIGBEE, or other protocols). One or more of the one or more interfaces 518 can facilitate connection of the computing environment 500 to a network 590.

The set of computers 510 can include any of a variety of other components to facilitate the performance of operations described herein. Example components include one or more power units (e.g., batteries, capacitors, power harvesters, or power supplies) that provide operational power, one or more buses to provide intra-device communication, one or more cases or housings to encase one or more components, other components, or combinations thereof.

A person of skill in the art, having benefit of this disclosure, may recognize various ways for implementing technology described herein, such as by using any of a variety of programming languages (e.g., a C-family programming language, PYTHON, JAVA, RUST, HASKELL, other languages, or combinations thereof), libraries (e.g., libraries that provide functions for obtaining, processing, and presenting data), compilers, and interpreters to implement aspects described herein. Example libraries include NLTK (Natural Language Toolkit) by Team NLTK (providing natural language functionality), PYTORCH by META (providing machine learning functionality), NUMPY by the NUMPY Developers (providing mathematical functions), and BOOST by the Boost Community (providing various data structures and functions), among others. Operating systems (e.g., WINDOWS, LINUX, MACOS, IOS, and ANDROID) may provide their own libraries or application programming interfaces useful for implementing aspects described herein, including user interfaces and interacting with hardware or software components. Web applications can also be used, such as those implemented using JAVASCRIPT or another language. A person of skill in the art, with the benefit of the disclosure herein, can use programming tools to assist in the creation of software or hardware to achieve techniques described herein, such as intelligent code completion tools (e.g., INTELLISENSE) and artificial intelligence tools (e.g., GITHUB COPILOT).

In some examples, large language models can be used to understand natural language, generate natural language, or perform other tasks. Examples of such large language models include CHATGPT by OPENAI, a LLAMA model by META, a CLAUDE model by ANTHROPIC, others, or combinations thereof. Such models can be fine-tuned on relevant data using any of a variety of techniques to improve the accuracy and usefulness of the answers. The models can be run locally on server or client devices or accessed via an application programming interface. Some of those models or services provided by entities responsible for the models may include other features, such as speech-to-text features, text-to-speech, image analysis, research features, and other features, which may also be used as applicable.

Machine Learning Framework

Figure 6:
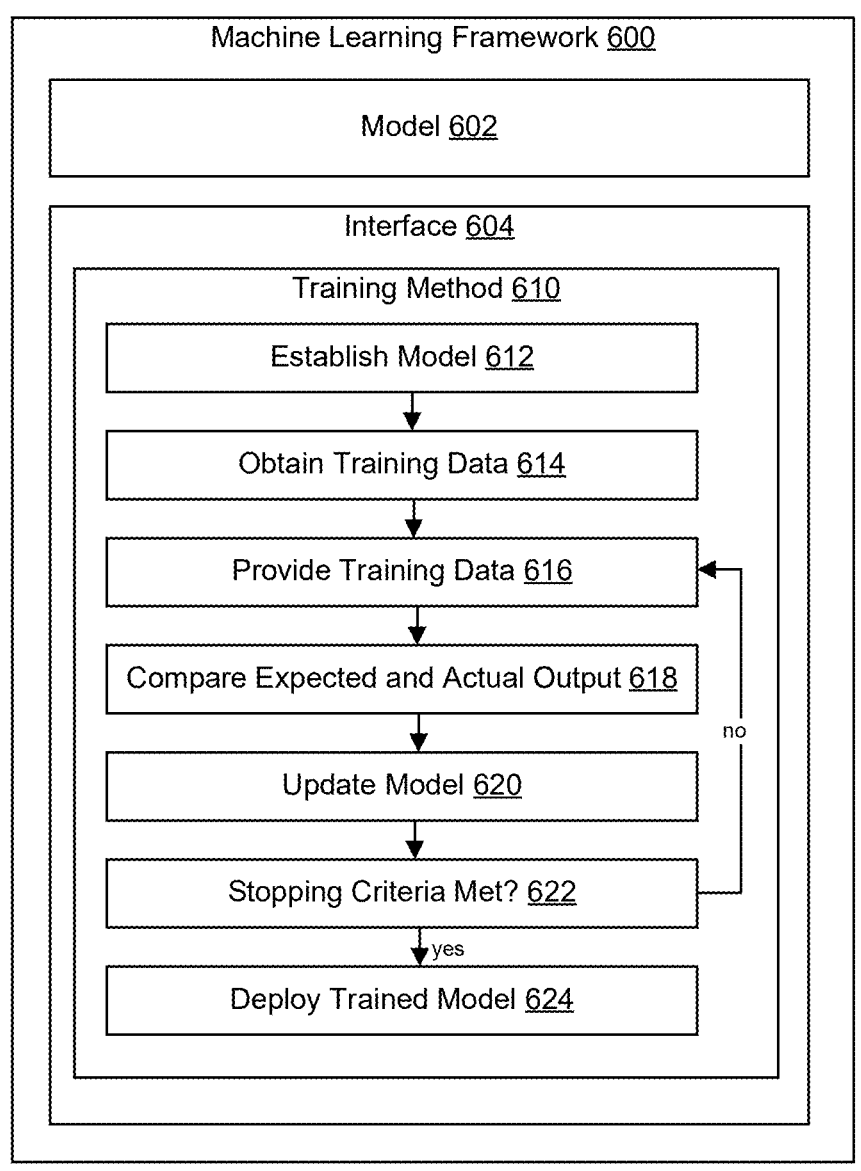

FIG. 6 illustrates an example machine learning framework 600 that techniques described herein may benefit from. A machine learning framework 600 is a collection of software and data that implements artificial intelligence trained to provide output, such as predictive data, based on input. Examples of artificial intelligence that can be implemented with machine learning ways include neural networks (e.g., graph neural networks), language models (including so-called "large language models"), generative models, natural language processing models, adversarial networks, decision trees, Markov models, support vector machines, genetic algorithms, others, or combinations thereof. A person of skill in the art, having the benefit of this disclosure, will understand that these artificial intelligence implementations need not be equivalent to each other and may instead select from among them based on the context in which they will be used. A machine learning framework 600 or components thereof are often built or refined from existing frameworks, such as TENSORFLOW by GOOGLE, INC. or PYTORCH by the PYTORCH community.

The machine learning framework 600 can include one or more versions of the model 602 that are the structured representation of learning and an interface 604 that supports use of the model 602. The model 602 can take any of a variety of forms. In many examples, the model 602 includes representations of nodes (e.g., neural network nodes, decision tree nodes, Markov model nodes, other nodes, or combinations thereof) and connections between nodes (e.g., weighted or unweighted unidirectional or bidirectional connections). In certain implementations, the model 602 can include a representation of memory (e.g., providing long short-term memory functionality). Where the set includes multiple versions of the model 602, the multiple versions of the model 602 can be linked, cooperate, or compete to provide output.

The interface 604 can include software procedures (e.g., defined in a library) that facilitate the use of the model 602, such as by providing a way to establish and interact with the model 602. For instance, the software procedures can include software for receiving input, preparing input for use (e.g., by performing vector embedding, such as using Word2Vec, BERT, or another technique), processing the input with the model 602, providing output, training the model 602, performing inference with the model 602, fine-tuning the model 602, other procedures, or combinations thereof.

In an example implementation, interface 604 can be used to facilitate a training method 610 that can include operation 612. Operation 612 includes establishing a model 602, such as initializing a model 602. The establishing can include setting up the model 602 for further use (e.g., by training or fine tuning). The model 602 can be initialized with values. In examples, the model 602 can be pretrained. Operation 614 can follow operation 612. Operation 614 includes obtaining training data. In many examples, the training data includes pairs of input and desired output given the input. In supervised or semi-supervised training, the data can be prelabeled, such as by human or automated labelers. In unsupervised learning, the training data can be unlabeled. The training data can include validation data used to validate the model 602 after the model 602 is trained. Operation 616 can follow operation 614. Operation 616 includes providing a portion of the training data to the model 602. This can include providing the training data in a format usable by the model 602. The machine learning framework 600 (e.g., via the interface 604) can cause the model 602 to produce an output based on the input. Operation 618 can follow operation 616. Operation 618 includes comparing the expected output with the actual output. In an example, this can include applying a loss function to determine the difference between expected and actual. This value can be used to determine how training is progressing. Operation 620 can follow operation 618. Operation 620 includes updating the model 602 based on the result of the comparison. This can take any of a variety of forms depending on the nature of the model 602. Where the model 602 includes weights, the weights can be modified to increase the likelihood that the model 602 will produce the correct output given an input. Depending on the model 602, backpropagation or other techniques can be used to update the model 602. Operation 622 can follow operation 620. Operation 622 includes determining whether a stopping criterion has been reached, such as based on the output of the loss function (e.g., actual value or change in value over time). In addition to, or instead, whether the stopping criterion has been reached can be determined based on a number of training epochs that have occurred or an amount of training data that has been used. In some examples, satisfaction of the stopping criterion can include If the stopping criterion has not been satisfied, the flow of the method can return to operation 614. If the stopping criterion has been satisfied, the flow can move to operation 622. Operation 622 includes deploying the model 602 for use in production, such as providing the model 602 with real-world input data and producing output data used in a real-world process. The model 602 can be stored in memory 514 of the set of computers 510 or distributed across memories of two or more computers of the set of computers 510 for production of output data (e.g., predictive data).

Application of Techniques

Techniques herein may be applicable to improving technological processes of a financial institution, such as technological aspects of actions (e.g., resisting fraud, entering loan agreements, transferring financial instruments, or facilitating payments). Although technology may be related to processes performed by a financial institution, unless otherwise explicitly stated, claimed inventions are not directed to fundamental economic principles, fundamental economic practices, commercial interactions, legal interactions, or other patent ineligible subject matter without something significantly more. As used in this disclosure, a random process may include a pseudorandom process that involves the use of one or more algorithms to generate pseudorandom values. A random process may also include a physics-based random process that involves the use of a physical measurement to generate a random value.

Where implementations involve personal or corporate data, that data can be stored in a manner consistent with relevant laws and with a defined privacy policy. In certain circumstances, the data can be decentralized, anonymized, or fuzzed to reduce the amount of accurate private data that is stored or accessible at a particular computer. The data can be stored in accordance with a classification system that reflects the level of sensitivity of the data and that encourages human or computer handlers to treat the data with a commensurate level of care.

Where implementations involve machine learning, machine learning can be used according to a defined machine learning policy. The policy can encourage the training of a machine learning model with a diverse set of training data. Further, the policy can encourage testing for, and correcting undesirable bias embodied in the machine learning model. The machine learning model can further be aligned such that the machine learning model tends to produce output consistent with a predetermined morality. Where machine learning models are used in relation to a process that makes decisions affecting individuals, the machine learning model can be configured to be explainable such that the reasons behind the decision can be known or determinable. The machine learning model can be trained or configured to avoid making decisions based on protected characteristics.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety (i.e., the entire portion), of a given item (e.g., data) unless the context clearly dictates otherwise. Furthermore, a "set" may refer to a singular form or a plural form, such that a "set of items" may refer to one item or a plurality of items.

In some embodiments, the operations described in this disclosure may be implemented in a set of processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on a set of non-transitory, machine-readable media, such as an electronic storage medium. Furthermore, the use of the term "media" may include a single medium or combination of multiple media, such as a first medium and a second medium. A set of non-transitory, machine-readable media storing instructions may include instructions included on a single medium or instructions distributed across multiple media. The processing devices may include one or more devices configured through hardware, firmware, and/or software to be specifically designed for the execution of one or more of the operations of the methods.

It should be noted that the features and limitations described in any one embodiment may be applied to any other embodiment herein, and a flowchart or examples relating to one embodiment may be combined with any other embodiment in a suitable manner, done in different orders, or done in parallel. Furthermore, not all operations of a flowchart need to be performed. In addition, the systems and methods described herein may be performed in real time. It should also be noted that the systems and/or methods described above may be applied to, or used in accordance with, other systems and/or methods.

In some embodiments, the various computer systems and subsystems illustrated in FIG. 1 may include one or more computing devices that are programmed to perform the functions described herein. The computing devices may include one or more electronic storages (e.g., a set of databases accessible to one or more applications depicted in the system 100), one or more physical processors programmed with one or more computer program instructions, and/or other components. For example, the set of databases may include a relational database such as a PostgreSQL™ database or MySQL database. Alternatively, or additionally, the set of databases or other electronic storage used in this disclosure may include a non-relational database, such as a Cassandra™ database, MongoDB™ database, Redis database, Neo4j™ database, Amazon Neptune™ database, etc.

The computing devices may include communication lines or ports to enable the exchange of information with a set of networks (e.g., a network used by the system 100) or other computing platforms via wired or wireless techniques. The network may include the internet, a mobile phone network, a mobile voice or data network (e.g., a 5G or Long-Term Evolution (LTE) network), a cable network, a public switched telephone network, or other types of communications networks or combination of communications networks. A network described by devices or systems described in this disclosure may include one or more communications paths, such as Ethernet, a satellite path, a fiber-optic path, a cable path, a path that supports internet communications (e.g., IPTV), free-space connections (e.g., for broadcast or other wireless signals), Wi-Fi, Bluetooth, near field communication, or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Each of these devices described in this disclosure may also include electronic storages. The electronic storages may include non-transitory storage media that electronically stores information. The storage media of the electronic storages may include one or both of (i) system storage that is provided integrally (e.g., substantially non-removable) with servers or client computing devices, or (ii) removable storage that is removably connectable to the servers or client computing devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). An electronic storage may store software algorithms, information determined by the processors, information obtained from servers, information obtained from client computing devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent the processing functionality of a plurality of devices operating in coordination. The processors may be programmed to execute computer program instructions to perform functions described herein of subsystems described in this disclosure or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems described herein is for illustrative purposes, and is not intended to be limiting, as any of the subsystems described in this disclosure may provide more or less functionality than is described. For example, one or more of subsystems described in this disclosure may be eliminated, and some or all of its functionality may be provided by other ones of subsystems described in this disclosure. As another example, additional subsystems may be programmed to perform some, or all of the functionality attributed herein to one of the subsystems described in this disclosure.

With respect to the components of computing devices described in this disclosure, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Further, some or all of the computing devices described in this disclosure may include a user input interface and/or user output interface (e.g., a display) for use in receiving and displaying data. In some embodiments, a display such as a touchscreen may also act as a user input interface. It should be noted that in some embodiments, one or more devices described in this disclosure may have neither user input interface nor displays and may instead receive and display content using another device (e.g., a dedicated display device such as a computer screen and/or a dedicated input device such as a remote control, mouse, voice input, etc.). Additionally, one or more of the devices described in this disclosure may run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include," "including," "includes," and the like mean including, but not limited to. As used throughout this application, the singular forms "a," "an," and "the" include plural referents unless the context clearly indicates otherwise. Thus, for example, reference to "an element" or "the element" includes a combination of two or more elements, notwithstanding the use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., a set of processors performing steps/operations A, B, C, and D) encompass all such attributes or functions being mapped to all such objects and subsets of the attributes or functions being mapped to subsets of the attributes or functions (e.g., both/all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors. Unless the context clearly indicates otherwise, statements that "each" instance of some collection has some property should not be read to exclude cases where some otherwise identical or similar members of a larger collection do not have the property (i.e., each does not necessarily mean each and every). Limitations as to the sequence of recited steps should not be read into the claims unless explicitly specified (e.g., with explicit language like "after performing X, performing Y") in contrast to statements that might be improperly argued to imply sequence limitations (e.g., "performing X on items, performing Y on the X'ed items") used for purposes of making claims more readable rather than specifying a sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Furthermore, unless indicated otherwise, updating an item may include generating the item or modifying an existing item. Thus, updating a record may include generating a record or modifying the value of an already-generated value in a record.

Unless the context clearly indicates otherwise, ordinal numbers used to denote an item do not define the item's position. For example, an item that may be a first item of a set of items even if the item is not the first item to have been added to the set of items or is otherwise indicated to be listed as the first item of an ordering of the set of items. Thus, for example, if a set of items is sorted in a sequence from "item 1," "item 2," and "item 3," a first item of a set of items may be "item 2" unless otherwise stated.

Embodiments

The present techniques will be better understood with reference to the following enumerated embodiments:

1. A method including: storing first content representations in a first server and second content representations in a second server; generating a query representation based on a query; retrieving an intermediate set of representations by concurrently using the first server to detect similarities based on the first content representations to retrieve a first representation subset and the second server to detect similarities based on the second content representations to retrieve a second representation subset; using a graph neural network to re-rank similarities between the query and the intermediate set of representations to select a ranked graph subset satisfying a threshold; determining an input context including at least a portion of selected content including data from the first server and the second server based on an association between the selected content and the ranked graph subset; and generating a language model response by transmitting, to an application program interface of a large language model, an input including the query and the input context.

2. A method including: storing, in a networked plurality of servers including a first server and a second server, a distributed graph system by storing first content graphs in association with a first content subset in a first server and second content graphs in association with a second content subset in a second server; generating a query graph based on a natural language query obtained from a client device; retrieving an intermediate set of graphs including a first graph subset and a second graph subset indicating similarities representing content relevancies with the query graph by concurrently using (1) the first server to retrieve the first graph subset with a retriever graph neural network to rank similarities between the query graph and the first content graphs and (2) the second server to retrieve the second graph subset by using the retriever graph neural network to rank similarities between the query graph and the second content graphs; using a re-ranking graph neural network to re-rank similarities between the query graph and the intermediate set of graphs to select a ranked graph subset satisfying a threshold; retrieving first content from the first server and second content from the second server based on associations between the first content, the second content, and the ranked graph subset; and generating a language model response by transmitting, to an application program interface of a large language model, an input including the natural language query and a query augmentation context, the query augmentation context including the first content and the second content.

3. A method including: storing, in a networked plurality of servers including a first server and a second server, a distributed graph by storing first content graphs in the first server and second content graphs in the second server; generating a query graph based on a natural language query obtained from a client device; retrieving an intermediate set of graphs by concurrently using (1) the first server to retrieve a first graph subset with a first graph neural network to detect similarities between the query graph and the first content graphs and (2) the second server to retrieve a second graph subset by using the first graph neural network to detect similarities between the query graph and the second content graphs; using a second graph neural network to re-rank similarities between the query graph and the intermediate set of graphs to select a ranked graph subset satisfying a threshold; retrieving selected content including data from the first server and the second server based on an association between the selected content and the ranked graph subset; and generating a language model response by transmitting, to an application program interface of a large language model, an input including the natural language query and a query augmentation context including the selected content.

4. A method of any of the embodiments above, wherein retrieving the intermediate set of graphs includes: generating a query graph embedding by providing the first graph neural network with the query graph; generating a first set of content graph embeddings by providing the first graph neural network with the first content graphs; determining first similarity scores between the first set of content graph embeddings and the query graph embedding; and selecting the first graph subset based on a comparison of the first similarity scores and a first stage minimum similarity threshold.

5. A method of any of the embodiments above, wherein using the second server to retrieve the second graph subset includes: generating a second set of content graph embeddings by providing the first graph neural network with the second content graphs; determining second similarity scores between the second set of content graph embeddings and the query graph embedding while concurrently determining the first similarity scores; and selecting the second graph subset based on a comparison of the second similarity scores and the first stage minimum similarity threshold.

6. A method of any of the embodiments above, wherein: using the first server to retrieve the first graph subset with the first graph neural network includes using a first set of graphics processing units or tensor processing units controlled by the first server to execute the first graph neural network, and using the second server to retrieve the second graph subset with the first graph neural network includes using a second set of graphics processing units or tensor processing units controlled by the second server to execute the first graph neural network.

7. A method of any of the embodiments above, wherein the second graph neural network has a greater number of neural network layers relative to the first graph neural network.

8. A method of any of the embodiments above, wherein retrieving the intermediate set of graphs includes generating a first query graph embedding user the first graph neural network, and wherein using the second graph neural network to re-rank similarities includes: generating a second query graph embedding by providing the query graph to the second graph neural network; generating an additional set of content graph embeddings by providing the second graph neural network with the intermediate set of graphs; determining an additional set of similarity scores based on the second query graph embedding and the additional set of content graph embeddings; and selecting the ranked graph subset based on comparisons between the additional set of similarity scores and the threshold.

9. A method of any of the embodiments above, wherein: storing the first content graphs in the first server includes: obtaining a first document; using a lossless operation to generate a first lossless set of graphs based on the first document; and storing, in the first server, the first lossless set of graphs in association with the first document, wherein using the first server to retrieve the first graph subset includes generating a first content graph embedding by providing at least one graph of the first lossless set of graphs to the first graph neural network; and storing the second content graphs in the second server includes: obtaining a second document; using the lossless operation to generate a second lossless set of graphs based on the second document; and storing, in the second server, the second lossless set of graphs in association with the first document, wherein using the second server to retrieve the second graph subset includes generating a second content graph embedding by providing at least one graph of the second lossless set of graphs to the first graph neural network.

10. A method of any of the embodiments above, wherein the lossless operation includes at least one of a universal dependencies operation, an abstract meaning representation operation, or an abstract syntax tree operation.

11. A method of any of the embodiments above, wherein storing the first content graphs in the first server includes storing the first content graphs in association with a first content subset, and wherein the first content subset is stored in a relational database.

12. A method of any of the embodiments above, wherein the natural language query is provided by the client device at a first time, further including presenting the language model response on a display of the client device at a second time that is within one minute of the first time.

13. A method of any of the embodiments above, wherein the first content representations are first document-level embeddings, and wherein storing first content representations in the first server includes providing a first set of documents to an encoder model to generate the first document-level embeddings.

14. A method of any of the embodiments above, wherein generating the query representation includes providing, to the encoder model, the query.

15. A method of any of the embodiments above, wherein storing the first content representations includes storing the first content representations in a first vector database using a random or pseudorandom process, and wherein storing the second content representations includes storing the second content representations in a second vector database using a random or pseudorandom process.

16. A method of any of the embodiments above, further including: generating a first plurality of vector clusters by clustering the first content representations; and generating a second plurality of vector clusters by clustering the second content representations.

17. A method of any of the embodiments above, wherein clustering the first content representations includes using a vector similarity search algorithm to determine one or more clusters of content representations.

18. A method of any of the embodiments above, wherein retrieving the intermediate set of representations includes: obtaining an integer parameter; and limiting a count of the intermediate set of representations to the integer parameter.

19. A method of any of the embodiments above, further including: generating intermediate set of graphs based on the intermediate set of representations by providing, to a graph generator, a set of content mapped to the intermediate set of representations, wherein using the graph neural network includes: generating a set of content graph embeddings by providing the intermediate set of graphs to the graph neural network as a set of graph neural network inputs; generating a query graph based on the query; generating a query graph embedding by providing the query graph to the graph neural network as a graph neural network input, wherein re-ranking similarities between the query and the intermediate set of representations includes ranking the similarities based on query graph embedding and the set of content graph embeddings.

20. A method of any of the embodiments above, further including: obtaining an indication of a context window of the large language model; determining a size of the input context based on the indication of a context window.

21. One or more tangible, non-transitory, machine-readable media storing instructions that, when executed by a set of processors, cause the set of processors to effectuate operations including those of any of embodiments 1 to 20.

22. A system comprising: a set of processors and a set of media storing computer program instructions that, when executed by the set of processors, cause the set of processors to effectuate operations including those of any of embodiments 1 to 20.

What is claimed is:

1. A system for increasing relevant content transmission for a distributed network by concurrently retrieving relevant content from a distributed graph, the system comprising one or more processors and one or more non-transitory, machine-readable media storing program instructions causing the one or more processors to perform operations comprising:

storing, in a networked plurality of servers comprising a first server and a second server, a distributed graph system by storing first content graphs in association with a first content subset in a first server and second content graphs in association with a second content subset in a second server;

generating a query graph based on a natural language query obtained from a client device;

retrieving an intermediate set of graphs comprising a first graph subset and a second graph subset indicating similarities representing content relevancies with the query graph by concurrently using the first server and the second server to retrieve respective graph subsets in parallel using the same retriever graph neural network executing on respective processors of the first and second servers, wherein (1) the first server retrieves the first graph subset with the retriever graph neural network to rank similarities between the query graph and the first content graphs and (2) the second server retrieves the second graph subset by using the retriever graph neural network to rank similarities between the query graph and the second content graphs;

using a re-ranking graph neural network to re-rank similarities between the query graph and the intermediate set of graphs to select a ranked graph subset satisfying a threshold;

retrieving first content from the first server and second content from the second server based on associations between the first content, the second content, and the ranked graph subset; and generating a language model response by transmitting, to an application program interface of a large language model, an input comprising the natural language query and a query augmentation context, the query augmentation context comprising the first content and the second content.

2. A method for increasing relevant content transmission for a distributed network comprising:

storing, in a networked plurality of servers comprising a first server and a second server, a distributed graph by storing first content graphs in the first server and second content graphs in the second server;

generating a query graph based on a natural language query obtained from a client device;

retrieving an intermediate set of graphs by concurrently using the first server and the second server to retrieve respective graph subsets in parallel using the same first graph neural network executing on respective processors of the first and second servers, wherein (1) the first server retrieves a first graph subset with the first graph neural network to detect similarities between the query graph and the first content graphs and (2) the second server retrieves a second graph subset by using the first graph neural network to detect similarities between the query graph and the second content graphs;

using a second graph neural network to re-rank similarities between the query graph and the intermediate set of graphs to select a ranked graph subset satisfying a threshold;

retrieving selected content comprising data from the first server and the second server based on an association between the selected content and the ranked graph subset; and generating a language model response by transmitting, to an application program interface of a large language model, an input comprising the natural language query and a query augmentation context comprising the selected content.

3. The method of claim 2, wherein retrieving the intermediate set of graphs comprises:

generating a query graph embedding by providing the first graph neural network with the query graph;

generating a first set of content graph embeddings by providing the first graph neural network with the first content graphs;

determining first similarity scores between the first set of content graph embeddings and the query graph embedding; and selecting the first graph subset based on a comparison of the first similarity scores and a first stage minimum similarity threshold.

4. The method of claim 3, wherein using the second server to retrieve the second graph subset comprises:

generating a second set of content graph embeddings by providing the first graph neural network with the second content graphs;

determining second similarity scores between the second set of content graph embeddings and the query graph embedding while concurrently determining the first similarity scores; and selecting the second graph subset based on a comparison of the second similarity scores and the first stage minimum similarity threshold.

5. The method of claim 2, wherein:

using the first server to retrieve the first graph subset with the first graph neural network comprises using a first set of graphics processing units or tensor processing units controlled by the first server to execute the first graph neural network, and using the second server to retrieve the second graph subset with the first graph neural network comprises using a second set of graphics processing units or tensor processing units controlled by the second server to execute the first graph neural network.

6. The method of claim 2, wherein the second graph neural network has at least one more neural network layer than the first graph neural network.

7. The method of claim 2, wherein retrieving the intermediate set of graphs comprises generating a first query graph embedding user the first graph neural network, and wherein using the second graph neural network to re-rank similarities comprises:

generating a second query graph embedding by providing the query graph to the second graph neural network;

generating an additional set of content graph embeddings by providing the second graph neural network with the intermediate set of graphs;

determining an additional set of similarity scores based on the second query graph embedding and the additional set of content graph embeddings; and selecting the ranked graph subset based on comparisons between the additional set of similarity scores and the threshold.

8. The method of claim 2, wherein:

storing the first content graphs in the first server comprises:

obtaining a first document;

using a lossless operation to generate a first lossless set of graphs based on the first document; and storing, in the first server, the first lossless set of graphs in association with the first document, wherein using the first server to retrieve the first graph subset comprises generating a first content graph embedding by providing at least one graph of the first lossless set of graphs to the first graph neural network; and storing the second content graphs in the second server comprises:

obtaining a second document;

using the lossless operation to generate a second lossless set of graphs based on the second document; and storing, in the second server, the second lossless set of graphs in association with the first document, wherein using the second server to retrieve the second graph subset comprises generating a second content graph embedding by providing at least one graph of the second lossless set of graphs to the first graph neural network.

9. The method of claim 8, wherein the lossless operation comprises at least one of a universal dependencies operation, an abstract meaning representation operation, or an abstract syntax tree operation.

10. The method of claim 2, wherein storing the first content graphs in the first server comprises storing the first content graphs in association with a first content subset, and wherein the first content subset is stored in a relational database.

11. The method of claim 2, wherein the natural language query is provided by the client device at a first time, further comprising presenting the language model response on a display of the client device at a second time that is within one minute of the first time.

12. One or more non-transitory, machine-readable media storing program instructions that, when executed by one or more processors, causes the one or more processors to perform operations comprising:

storing first content representations in a first server and second content representations in a second server;

generating a query representation based on a query;

retrieving an intermediate set of representations by concurrently using the first server and the second server to retrieve respective representation subsets in parallel, wherein the first server detects similarities based on the first content representations to retrieve a first representation subset and the second server detects similarities based on the second content representations to retrieve a second representation subset;

using a graph neural network to re-rank similarities between the query and the intermediate set of representations to select a ranked graph subset satisfying a threshold;

determining an input context comprising at least a portion of selected content comprising data from the first server and the second server based on an association between the selected content and the ranked graph subset; and generating a language model response by transmitting, to an application program interface of a large language model, an input comprising the query and the input context.

13. The one or more non-transitory, machine-readable media of claim 12, wherein the first content representations are first document-level embeddings, and wherein storing first content representations in the first server comprises providing a first set of documents to an encoder model to generate the first document-level embeddings.

14. The one or more non-transitory, machine-readable media of claim 13, wherein generating the query representation comprises providing, to the encoder model, the query.

15. The one or more non-transitory, machine-readable media of claim 12, wherein storing the first content representations comprises storing the first content representations in a first vector database using a random or pseudorandom process, and wherein storing the second content representations comprises storing the second content representations in a second vector database using a random or pseudorandom process.

16. The one or more non-transitory, machine-readable media of claim 12, further comprising:

generating a first plurality of vector clusters by clustering the first content representations; and generating a second plurality of vector clusters by clustering the second content representations.

17. The one or more non-transitory, machine-readable media of claim 16, wherein clustering the first content representations comprises using a vector similarity search algorithm to determine one or more clusters of content representations.

18. The one or more non-transitory, machine-readable media of claim 12, wherein retrieving the intermediate set of representations comprises:

obtaining an integer parameter; and limiting a count of the intermediate set of representations to the integer parameter.

19. The one or more non-transitory, machine-readable media of claim 12, further comprising:

generating intermediate set of graphs based on the intermediate set of representations by providing, to a graph generator, a set of content mapped to the intermediate set of representations, wherein using the graph neural network comprises:

generating a set of content graph embeddings by providing the intermediate set of graphs to the graph neural network as a set of graph neural network inputs;

generating a query graph based on the query;

generating a query graph embedding by providing the query graph to the graph neural network as a graph neural network input, wherein re-ranking similarities between the query and the intermediate set of representations comprises ranking the similarities based on query graph embedding and the set of content graph embeddings.

20. The one or more non-transitory, machine-readable media of claim 12, further comprising:

obtaining an indication of a context window of the large language model;

determining a size of the input context based on the indication of a context window.

* * * * *